United States Patent [19]

Boocock et al.

[11] Patent Number: 5,173,539
[45] Date of Patent: Dec. 22, 1992

[54] CONCENTRATES OF MODIFYING AGENTS IN POLYMERS

[75] Inventors: John R. B. Boocock; David A. Harbourne, both of Kingston, Canada

[73] Assignee: Du Pont Canada Inc., Mississauga, Canada

[21] Appl. No.: 575,472

[22] Filed: Aug. 30, 1990

[30] Foreign Application Priority Data

Sep. 4, 1989 [GB] United Kingdom ............... 8919896

[51] Int. Cl.$^5$ ........................................... C08F 263/04
[52] U.S. Cl. .................................. 525/244; 525/285; 525/286; 525/288; 525/301
[58] Field of Search ............... 525/288, 244, 263, 285, 525/286, 293, 301, 309

[56] References Cited

U.S. PATENT DOCUMENTS 4,678,834 7/1987 Bolvin et al. ........................... 525/74
4,707,517 11/1987 Bullen et al. ........................... 525/72

FOREIGN PATENT DOCUMENTS 172650 2/1986 European Pat. Off. .
320120 6/1989 European Pat. Off. .
2187464 9/1987 United Kingdom .

Primary Examiner—Melvin I. Marquis
Assistant Examiner—D. E. Aylward

[57] ABSTRACT

A concentrate comprising a carrier polymer and at least 30%, by weight of the carrier polymer, of at least one modifying agent for a thermoplastic polymer is disclosed. The carrier polymer is a polymer of alpha-olefins having a heat of crystallization of less than 70 J/g and, if the copolymer is an ethylene/vinyl acetate copolymer, containing at least 18% by weight of vinyl acetate comonomer. The modifying agent is absorbed into the carrier polymer. In embodiments, the modifying agent is a polymerizable monomer. The concentrates provide a versatile method of addition of modifying agents into thermoplastic polymers.

10 Claims, No Drawings

CONCENTRATES OF MODIFYING AGENTS IN POLYMERS

FIELD OF THE INVENTION

The present invention relates to concentrates of modifying agents in carrier polymers having a low crystallinity, as measured by heat of crystallization, and to the preparation and use of such concentrates. The modifying agents are agents that are generally capable of being reacted with a thermoplastic polymer. The concentrates are intended for use in the modification of thermoplastic polymers.

BACKGROUND OF THE INVENTION

It is often desirable to introduce a modifying agent, which may be in the form of a liquid or solid, into a polymer e.g. a polymer that is being processed in melt processing apparatus or a polymer that is to be subjected to melt processing apparatus, in order to modify the chemical and/or physical properties of the polymer; the polymer that is to be modified may be referred to hereinafter as the base polymer, such polymer being a thermoplastic polymer. The melt processing apparatus will usually be an extruder.

If the modifying agent is a liquid, the modifying agent is usually introduced into base polymer by injecting the liquid into the base polymer in melt processing apparatus, into either as yet unmelted base polymer or molten base polymer. This method has some disadvantages. For example, a liquid pumping or injection system is required, and such a system requires the attention of an operator, both of which add to the cost of modifying the polymer. In addition, as will be appreciated by those skilled in the art, it is often difficult or even impossible under such circumstances to get a uniform dispersion of the liquid in the polymer; uniform dispersion may be required to achieve desired or acceptable properties in the modified base polymer.

If the modifying agent is a solid at ambient temperatures but melts under extrusion conditions, it may be fed as either a pre-dry-blended admixture with the base polymer or as a separate metered feed directly into melt processing apparatus. In many instances, neither method is satisfactory. For example, where the modifying agent is in the form of a fine powder and the polymer is in the form of pellets, it may be difficult to avoid segregation of the modifying agent and base polymer in the preblended admixture, which may lead to a non-uniform modified polymer. If the solid modifying agent is fed separately into the melt processing apparatus, a separate feeder is required and it may be difficult to avoid unacceptable fluctuations in the proportions, especially at low proportions, of modifying agent fed into the base polymer over short time intervals, which would also lead to a non-uniform product. Moreover, because the solid modifying agent is not predispersed in a polymer, it may be difficult to obtain uniform dispersion of the modifying agent in the base polymer in the melt processing apparatus, which could also lead to a non-uniform product.

An alternative method is to coat all or most of the base polymer with the modifying agent prior to feeding the polymer to melt processing apparatus. Modifying agents that are solid at room temperature may often be applied in liquid form e.g. in a molten form or dissolved in a volatile solvent. This precoating method has the disadvantage that it requires an additional processing step that must be applied to a large portion, or all, of the base polymer.

A preferred method of addition of a modifying agent to a base polymer is by use of a so-called concentrate. For example, if it is desired to add the modifying agent to a base polymer at a concentration of 500 ppm, the modifying agent may be incorporated into a second or carrier polymer at a concentration of, for instance, 3%, to form a concentrate; in this instance, blending of 2.5% of the concentrate with 97.5% of base polymer results in the desired amount of modifying agent in the base polymer. If an appropriate carrier polymer has been selected, the modifying agent becomes uniformly dispersed in the base polymer during melt processing. In many compositions, the desirable properties of the modified base polymer will not be adversely affected to any significant extent by the presence of the carrier polymer. Although a separate processing step is required to prepare the concentrate, the cost of that step relates to a component that is a minor portion of the final product, rather than to the much larger amount of the base polymer with which the concentrate is used. If the concentrate of carrier polymer and modifying agent requires special, and hence more costly, packaging e.g. because of moisture sensitivity or toxicity, it is more economical to package a concentrate rather than the much larger volume of base polymer precoated with modifying agent.

There are many applications where the modifying agent should be or must be incorporated into the base polymer at higher concentrations than illustrated in the example above. For instance, it is possible to graft many monomers onto a base polymer at a level of 1-2%, which would require that the concentrate contain 20-40% of the modifying agent even if the amount of carrier polymer to be introduced into the base polymer is at the relatively high level of 5% by weight.

If the modifying agent is a liquid, such a high concentration of agent in carrier polymer cannot normally be achieved with conventional carrier polymers e.g. polyethylene. Such carrier polymers will not absorb more than a few percent of most liquids; even if a liquid is melt blended into the carrier polymer, most of the liquid will separate from the polymer on solidification of the concentrate or subsequently quickly weep out of the concentrate.

If the modifying agent is a solid, high concentrations of agent in polymer may often be achieved by melt extrusion techniques, and after cooling the modifying agent will often not separate from the carrier polymer. However, it may still be preferable e.g. if a suitable extruder is not available, to prepare a concentrate by applying the modifying agent to a solid carrier polymer in molten form.

Published European patent application 0 172 650 of G. White, published 1986 Feb. 26, discloses a polyolefin blend comprising, in physical admixture, a major portion of particles of a first polyolefin and a minor portion of particles of a second polyolefin. Both polyolefins are selected from the group consisting of homopolymers and copolymers of hydrocarbon alpha-olefins having 2-10 carbon atoms. The second polyolefin is in the form of a composition with a modifying agent which is a reactive agent or, preferably, a cross-linking agent. Examples of modifying agents are acrylic acid, methacrylic acid, maleic acid, fumaric acid, itaconic acid, crotonic acid, maleic anhydride, cross-linkable silane compounds e.g. vinyl trimethoxy silane, vinyl triethoxy silane, vinyl tris(2-methoxyethoxy) silane and vinyl methyl dimethoxy silane, and other compounds capable of being reacted with molten polyethylene. Related U.S. Pat. No. 4 678 834 of D. W. Boivin and R. A. Zelonka, which issued 1987 Jul. 07, utilizes a variety of alpha-olefin polymers as the second polymer, including homopolymers and copolymers of unsaturated hydrocarbons, ionomers, graft copolymers, and homopolymers and copolymers of vinyl esters of aliphatic carboxylic acids, including copolymers of such vinyl esters with ethylene.

One method of obtaining high concentrations of modifying agent in carrier polymer is by encapsulation of the modifying agent in polymer pellets. A particularly effective way of doing this is described in published European patent application No. 0 320 120 of D. S. Dykes, K. Chu and G. White, published 1989 Jun. 14. However, the preparation of concentrates in this manner requires special processing apparatus, which may be too expensive for many applications. Moreover, the wall thickness of the capsule required in order to obtain acceptable capsules tends to place limitations on the proportion of liquid which may be encapsulated i.e. on the effective concentration of modifying agent in the carrier polymer, especially if the size of the pellet of the concentrate must be similar to those of conventional commercial pelletized polymers.

Masterbatch compositions comprising a substrate or carrier and a silane having a hydrolysable radical and a functional group that can undergo chemical reactions with amino, carboxyl and/or amide groups are disclosed in UK 2 187 464A of E. Schmid, published 1987 Sep. 09. It is disclosed that the carrier or substrate used, when a concentrate is formed by absorption, is a block copolymer with hard block and an elastomeric segment. The examples show that ethylene/vinyl acetate copolymers absorbed 10-20% by weight of silane.

SUMMARY OF THE INVENTION

It has now been found that concentrates of modifying agents in carrier polymers, especially concentrates containing in excess of 30% of modifying agent by weight of polymer, may be formed if the carrier polymer has a heat of crystallization of less than 70J/g or, if the carrier polymer is an ethylene/vinyl acetate copolymer, such a copolymer having at least 18% by weight of vinyl acetate comonomer.

Accordingly, the present invention provides a concentrate comprising:
(a) at least one copolymer selected from the group consisting of copolymers of ethylene with at least one comonomer selected from the group consisting of carbon monoxide, vinyl acetate, alkyl acrylates and alkyl methacrylates, in which the alkyl groups have 1-4 carbon atoms, said copolymer being in a particulate form, and said copolymer (i) having a heat of crystallization of less than 70J/g, and (ii) if said copolymer is ethylene/vinyl acetate copolymer, then the copolymer has a vinyl acetate content of at least 18% by weight; and
(b) at least 30% by weight of the carrier polymer of at least one modifying agent capable of being reacted with a thermoplastic polymer, said agent being selected from the group consisting of ethylenically unsaturated carboxylic acids and derivatives thereof and organosilanes, said modifying agent having been absorbed into the carrier polymer.

As used herein, "heat of crystallization" is determined by differential scanning calorimetry (DSC) as follows: a sample of polymer is heated at a rate of 20° C. per minute to a temperature above the melting point of the polymer, such temperature being at least 170° C. The polymer is then cooled at a rate of 10° C. per minute to a temperature of 0° C. The heat of crystallization is calculated from the resultant plot of heat output versus time.

In a preferred embodiment of the concentrate of the invention, the modifying agent is a grafting monomer and the concentrate also contains a catalyst for the grafting of the monomer onto a thermoplastic polymer.

In a further embodiment, the concentrate contains at least 50%, by weight of the carrier polymer, of modifying agent.

The present invention further provides a process for the manufacture of a concentrate comprising the steps of:
(a) contacting at least one copolymer selected from the group consisting of copolymers of ethylene with at least one comonomer selected from the group consisting of carbon monoxide, vinyl acetate, alkyl acrylates and alkyl methacrylates, in which the alkyl groups have 1-4 carbon atoms, said copolymer being in a particulate form, and said copolymer (i) having a heat of crystallization of less than 70J/g, and (ii) if said copolymer is ethylene/vinyl acetate copolymer, then the copolymer has a vinyl acetate content of at least 18% by weight; with
(b) at least 30% by weight of the carrier polymer of at least one modifying agent capable of being reacted with a thermoplastic polymer, said agent being selected from the group consisting of ethylenically unsaturated carboxylic acids and derivatives thereof and organosilanes, said modifying agent having been absorbed into the carrier polymer; and
(c) controlling the period of time of contact betweeen the the copolymer and the modifying agent to provide a concentration of modifying agent in the copolymer that is at least 30% by weight of the copolymer, provided that said copolymer does not dissolve in the modifying agent and said concentrate is in solid form.

In addition, the present invention provides a process for the modifying of a thermoplastic polymer, comprising the steps of:
(i) feeding to melt extrusion apparatus a thermoplastic polymer that is to be modified and a concentrate, said concentrate comprising:
(a) at least one copolymer selected from the group consisting of copolymers of ethylene with at least one comonomer selected from the group consisting of carbon monoxide, vinyl acetate, alkyl acrylates and alkyl methacrylates, in which the alkyl groups have 1-4 carbon atoms, said copolymer being in a particulate form, and said copolymer (i) having a heat of crystallization of less than 70J/g, and (ii) if said copolymer is ethylene/vinyl acetate copolymer, then the copolymer has a vinyl acetate content of at least ⁻18% by weight; and
(b) at least 30% by weight of the carrier polymer of at least one modifying agent capable of being reacted with a thermoplastic polymer, said agent being selected from the group consisting of ethylenically unsaturated carboxylic acids and derivatives thereof and organosilanes, said modifying agent having been absorbed into the carrier polymer;

(ii) admixing said thermoplastic polymer and concentrate in the melt extrusion apparatus, and
(iii) extruding a composition of modified thermoplastic polymer.

In a preferred embodiment of the process of the present invention, the modifying agent is a grafting agent and the concentrate also contains a catalyst for the grafting of the agent onto the thermoplastic polymer.

DESCRIPTION OF THE INVENTION

The present invention relates to a concentrate of a carrier polymer and a modifying agent. The carrier polymer is a copolymer of ethylene and at least one comonomer selected from carbon monoxide, vinyl acetate, alkyl acrylates and alkyl methacrylates, in which the alkyl group has 1-4 carbon atoms. In embodiments, the copolymer is characterized by having a heat of crystallization of less than 70J/g. Moreover, if the copolymer is an ethylene/vinyl acetate copolymer, then the copolymer has a vinyl acetate content of at least 18% by weight. Examples of the copolymers are ethylene/vinyl acetate copolymers, ethylene/methyl acrylate copolymers, ethylene/ethyl acrylate copolymers, ethylene/butyl acrylate copolymers, ethylene/isobutyl acrylate copolymers, ethylene/vinyl acetate/carbon monoxide copolymers, ethylene/ethyl acrylate/carbon monoxide copolymers, ethylene/butyl acrylate/carbon monoxide copolymers, ethylene/ethyl methacrylate/carbon monoxide copolymers and ethylene/butyl methacrylate/carbon monoxide copolymers. Such copolymers are used in particulate form, for example in the form of pellets, granules, powder or the like. The molecular weight of the copolymer may be varied over a wide range, and may depend to some extent on the intended end-use for the concentrates. For instance, although the subsequent required mixing of the modifying agent into the thermoplastic polymer tends to be more readily accomplished by use of a concentrate, both the nature and molecular weight of the carrier polymer of the concentrate i.e. the copolymer defined above, should be chosen to achieve the necessary degree of speed and extent of dispersion of the modifying agent. If this is not done, poor admixing of the polymer and concentrate may be obtained, which would tend to result in non-uniformity in the properties of the resultant modified thermoplastic polymer.

The copolymer has a heat of crystallization of less than 70J/g, preferably less than 57J/g and in particular less than 45J/g.

The concentrate is in the form of a solid i.e. the modifying agent does not dissolve the copolymer. If it should be observed that the combination of modifying agent and carrier polymer is such that the modifying agent tends to dissolve the copolymer, then lower amounts of modifying agent should be used, or a different carrier polymer or carrier polymer of different molecular weight should be selected, such that the concentrate remains as a solid. In addition, the concentrate must retain adequate flow properties for the intended end-use, as will be apparent to persons skilled in the art.

A variety of modifying agents may be used, provided that the modifying agents are capable of being absorbed into the carrier polymer. Thus, the modifying agents may be liquids, but they may also be solids as some solids are capable of being absorbed into the carrier polymers described herein when melted. The modifying agent is at least one said agent being selected from the group consisting of ethylenically unsaturated carboxylic acids and derivatives thereof and organosilanes. Examples of such modifying agents are given below.

In embodiments, the modifying agent is a substance that is capable of being grafted onto another, thermoplastic, polymer, sometimes referred to herein as base polymer. Examples of such grafting agents include vinyl trimethoxysilane (VTMS) and vinyl triethoxysilane (VTES), which may be used to make polymers cross-linkable by subsequent exposure to moisture, and acrylic acid which is used to make polymers compatible with basic fillers and with polar polymers e.g. polyamides. Other graftable monomers include glycidyl methacrylate, used for grafting epoxy functionality into polymers, and dimethylaminoethyl methacrylate used to introduce amine functionality by grafting. These monomers tend to be relatively toxic, and may be handled more conveniently in the form of a concentrate. Other modifying agents that are capable of being grafted onto a base polymer and formed into concentrates according to the invention include ethylenically unsaturated carboxylic acids and anhydrides e.g. maleic anhydride. As noted above, although some modifying agents e.g. maleic anhydride, are solids at ambient temperature, concentrates may be prepared if the agent is applied in molten form. The melting point of the agent should preferably be below the melting point of the polymer.

Other organosilane modifying agents may be also used. In addition, other ethylenically unsaturated carboxylic acids, or derivatives thereof, may be used. The derivatives include esters and amides.

The capacity of the carrier polymer for absorbing modifying agents varies widely with both the agent and the carrier polymer. For example ethylene/vinyl acetate copolymers (EVA) absorb acrylic acid to 30%, by weight, or more based in carrier polymer when the vinyl acetate content of the copolymer is 18% or more. At higher vinyl acetate contents, absorption of in excess of 300% by weight of acrylic acid is possible. In contact with excess acrylic acid, some grades of EVA will actually dissolve in the acrylic acid so that a useful concentrate is not formed by simply contacting the polymer with acrylic acid. In such instances, care must be taken in the selection of the carrier polymer and the proportion of modifying agent which is used and the method of preparation of the concentrate e.g. concentrates might be prepared by stepwise addition of a solution of modifying agent in a solvent that is not a solvent for the polymer, with removal of the solvent between addition steps. As is illustrated below, one grade of ethylene/vinyl acetate/carbon monoxide polymer absorbed over 700% acrylic acid when exposed to excess and still remained in pellet form. High absorption properties are also shown with other liquid modifying agents e.g. 3-aminopropyltriethyloxysilane, glycidyl methacrylate, N,N-dimethylaminoethylmethacrylate and methyl methacrylate.

The concentrates may be made in a number of ways. For example, the modifying agent and the carrier polymer may be melt compounded, for example in an extruder. Alternatively, the carrier polymer may be immersed in an excess of the modifying agent, especially liquid modifying agent, until the desired amount of modifying agent has been absorbed. Another method involves addition of the required amount of liquid modifying agent to the carrier polymer in a agitated device, and agitating until the liquid has been absorbed. At high concentrations of modifying agent, the pellets of carrier polymer tend to swell, and it might be preferable to select pellets of carrier polymer that are smaller than those of the base polymer so that after absorption of the modifying agent, the carrier and base polymer pellets will be of about the same size. This tends to minimize effects of pellets of different sizes to segregate.

If the modifying agent is a monomer, it may be necessary and/or desirable to incorporate a catalyst into the base polymer. Such a catalyst will depend on the nature of the monomer and the reaction with the base polymer, but may for instance be an organic peroxide. The catalyst may be separately added to the base polymer, but it may be preferable to add the catalyst as part of the concentrate, provided that the catalyst does not cause reaction of the monomer with the carrier polymer, with itself or with the base polymer prior to adequate mixing of the monomer and base polymer.

The concentrate may be used by blending with the base polymer e.g. by physically blending the concentrate and base polymer or by separately feeding the concentrate and base polymer to an extruder. The base polymer may be selected from a wide range of thermoplastic polymers. Examples include hydrocarbon polymers of $C_2$–$C_{10}$ alpha-olefins e.g. homopolymers of ethylene, butene-1 and octene-1, and copolymers of ethylene with propylene, butene-1, 4-methyl pentene-1, hexene-1 and octene-1, as well as terpolymers of ethylene, propylene and diene. Other polymers include polyvinyl chloride, polyvinylidene chloride, polyester, polystyrene, polycarbonate, polyamides, acrylic polymers, ethylene/vinyl alcohol copolymers, and copolymers of ethylene e.g. ethylene/vinyl acetate, ethylene/acrylic acid or methacrylic acid and ionomers thereof. Such polymers may in a form suitable for extrusion into films, sheets, rods, pipes and other products, injection moulding into containers or other articles, blow moulding into containers and the like, to form commercially-acceptable products.

The concentrates may be used in a variety of end-uses, including crosslinking of polymers, grafting of polymers, modification of flow properties and the like. The concentrates are intended for use with a wide variety of thermoplastic polymers.

Concentrates of vinyl silanes in carrier polymer and use thereof in moisture cross-linking of polymers are disclosed in the copending patent application of J. R. B. Boocock and D. A. Harbourne filed concurrently herewith.

The present invention is illustrated by the following examples.

EXAMPLE I

Weighed samples of pellets of the polymers listed below were immersed in a number of liquid modifying agents. After the periods of time given in Table 1 below, the resultant samples were removed from the liquid modifying agent, dried on paper tissues and weighed. The increase in weight i.e. liquid uptake, is also shown in Table 1, expressed as a percentage based on the weight of polymer.

The polymers were as follows:

A . . . A copolymer of ethylene/n-butyl acrylate (30%)/carbon monoxide (10%), having a specified melt index at 190° C. of 5 dg/min. The heat of crystallization was 33.5J/g.

B . . . A copolymer of ethylene/vinyl acetate (20.5%)/carbon monoxide (8%), with a specified melt index at 190° C. of 35 dg/min. The heat of crystallization was 65.7J/g.

C . . . A copolymer of ethylene/vinyl acetate (23%)/carbon monoxide (11%), with a specified melt index at 190 C of 35 dg/min. The heat of crystallization was 43.6J/g.

D . . . A copolymer of ethylene/vinyl acetate (40%), with a specified melt index at 190° of 48 to 66 dg/min. The heat of crystallization was 16.7J/g.

E . . . A copolymer of ethylene/vinyl acetate (33%), with a specified melt index at 190° of 38 to 48 dg/min. The heat of crystallization was 36.9J/g.

F . . . A copolymer of ethylene/vinyl acetate (28%), with a specified melt index at 190° of 2.6 to 3.4 dg/min. The heat of crystallization was 53.5J/g.

G . . . A copolymer of ethylene/vinyl acetate (25%), with a specified melt index at 190° of 1.7 to 2.3 dg/min. The heat of crystallization was 60.4J/g.

H . . . A copolymer of ethylene/vinyl acetate (18%), with a specified melt index at 190° of 6.7 to 9.3 dg/min. The heat of crystallization was 73.5J/g.

J . . . A copolymer of ethylene/vinyl acetate (12%), with a specified melt index at 190° of 6.7 to 9.3 dg/min. The heat of crystallization was 108J/g.

Polymer H and J are not carrier polymers of the invention.

Further details and the results obtained are given in Table I. In that Table, zirconium n-butoxide/butanol complex, glycerol and Lupersol ® 101 organic peroxide are comparative examples.

TABLE 1

| Polymer | A | B | C | D | E | F | G | H* | J* |
|---|---|---|---|---|---|---|---|---|---|
| Acrylic Acid | D | 736 | D | D | 326 | 79 | 55 | 31 | 9 |
|  |  | (234) |  |  | (234) | (122) | (122) | (122) | (122) |
| Zirconium n-butoxide/- | | 46 | 49 | 10 | | 62 | | | |
| butanol complex | | (234) | (234) | (504) | | (234) | | | |
| 3-Aminopropyltriethoxysilane | D | 1381 | D | D | 241 | 33 | 31 | 15 | 6 |
|  |  | (234) |  |  | (234) | (122) | (122) | (122) | (122) |
|  |  |  |  |  |  |  |  | (180) | (180) |
| Glycidyl methacrylate | 465 | 303 | 285 | 257 | 298 | 28 | 23 | 12 | 10 |
|  | (234) | (234) | (504) | (287) | (234) | (122) | (122) | (122) | (122) |
| N,N-dimethylaminoethyl- | 1225 | 232 | D | D | 526 | 69 | 48 | 26 | 12 |
| methacrylate | (234) | (234) |  |  | (234) | (122) | (122) | (122) | (122) |
| Methyl methacrylate | D | 324 | D | | D | | | | |
|  |  | (408) |  |  |  |  |  |  |  |
| Glycerol | | 88 | | 7 | 5 | 0 | | | |
|  |  | (548) |  | (548) | (216) | (548) | | | |
| Lupersol ® 101 (note 2) | | 25 | | 15 | 116 | 62 | 25 | | 6 |

TABLE 1-continued

| Polymer | A | B | C | D | E | F | G | H* | J* |
|---|---|---|---|---|---|---|---|---|---|
| | (286) | | (286) | (286) | (286) | | (286) | | (286) |

Note 1: Figures in parentheses are the duration of the soaking experiment in hours.
Note 2: Tradename for 2,5-dimethy-2,5-di(t-butylperoxyl)hexane
*Polymer is not of the invention the designation "D" indicates that the polymer dissolved.

This example illustrates the following:
1) Copolymers of ethylene and vinyl acetate containing 18% or more vinyl acetate may be used to form concentrates of the invention;
2) Polymers of alpha-olefins having a heat of crystallization of less than 70J/g may be used to form concentrates of the invention; and
3) In some instances, there are limits on the amount of modifying agent that may be absorbed or the choice of carrier polymer that may be used with a particular modifying agent, due to potential dissolution of the polymer in the modifying agent.

EXAMPLE II

This example illustrates the modification of polyethylene to make it adherable to aluminum, by grafting the polyethylene using a concentrate containing acrylic acid.

A concentrate was prepared as follows: 100 g of pellets of the EVA copolymer E of Example 1 were mixed with 200 g of acrylic acid for seven hours with shaking for about 1 minute approximately every hour and then allowed to stand overnight. The shaking procedure was repeated for a further eight hours and then the mixture was again allowed to stand overnight. It was noted that the acrylic acid had been absorbed by the copolymer but that the surface of the polymer was still wet. The copolymer pellets had swollen to about twice their original size.

A blend was prepared by shaking, in a polyethylene bag, 2500 g of a linear low density polyethylene, 75 g of the above acrylic acid/EVA concentrate and a polyethylene/peroxide blend. The linear low density of polyethylene was an ethylene/butene copolymer with a density of 0.924 g/cm$^3$ and a melt index at 190° C. of 20 dg/min. The polyethylene-peroxide blend was of 8800 ppm Lupersol® 101 organic peroxide on the same linear low density polyethylene; that organic peroxide is 2,5 dimethyl-2,5-di(t-butylperoxy)hexane. The mixture was fed to a twin screw extruder and extruded as chopped strand type pellets, at a melt temperature of 230° C.

The pellets obtained were melted between two sheets of aluminum foil at 190° C. for five minutes; the sandwich obtained was pressed at about 34 MPa for a further five minutes and then allowed to cool. There was significant adhesion between the two sheets of aluminum. In contrast, when a sandwich was made with the polyethylene without the concentrate or peroxide blend, the adhesion was poor.

We claim:
1. A concentrate consisting essentially of:
(a) at least one copolymer as a carrier polymer, the copolymer selected from the group consisting of copolymers of ethylene with at least one comonomer selected from the group consisting of carbon monoxide, vinyl acetate, alkyl acrylates and alkyl methacrylates, in which the alkyl groups have 1–4 carbon atoms, said copolymer being in a particulate form, and said copolymer (i) having a heat of crystallization of less than 70J/g, and (ii) if said copolymer is ethylene/vinyl acetate copolymer, then the copolymer has a vinyl acetate content of at least 18% by weight; and
(b) at least 30% by weight of the carrier polymer of at least one modifying agent capable of being reacted with a thermoplastic polymer, said agent being selected from the group consisting of ethylenically unsaturated carboxylic acids and derivatives thereof and organosilanes, said modifying agent having been absorbed into the carrier polymer and said concentrate is in solid form.
2. The concentrate of claim 1 in which the modifying agent is a grafting monomer and the concentrate also contains a catalyst for the grafting of the monomer onto a thermoplastic polymer.
3. The concentrate of claim 1 in which the concentrate contains at least 50%, by weight of the carrier polymer, of modifying agent.
4. The concentrate of claim 1 in which the copolymer is an ethylene/vinyl acetate copolymer.
5. The concentrate of claim 1 in which the copolymer is other than ethylene/vinyl acetate copolymer.
6. The concentrate of claim 1 in which the copolymer has a heat of crystallization of less than 57 J/g.
7. The concentrate of claim 1 in which the copolymer has a heat of crystallization of less than 45 J/g.
8. The concentrate of claim 1 in which the modifying agent is an ethylenically unsaturated carboxylic acid or derivative thereof.
9. The concentrate of claim 1 in which the modifying agent is an organosilane.
10. A process for the manufacture of a concentrate of claim 1 consisting essentially of the steps of:
(a) contacting at least one copolymer as a carrier polymer, the copolymer selected from the group consisting of copolymers of ethylene with at least one comonomer selected from the group consisting of carbon monoxide, vinyl acetate, alkyl acrylates and alkyl methacrylates, in which the alkyl groups have 1–4 carbon atoms, said copolymer being in a particulate form, and said copolymer (i) having a heat of crystallization of less than 70J/g, and (ii) if said copolymer is ethylene/vinyl acetate copolymer, then the copolymer has a vinyl acetate content of at least 18% by weight; with
(b) at least 30% by weight of the carrier polymer of at least one modifying agent capable of being reacted with a thermoplastic polymer, said agent being selected from the group consisting of ethylenically unsaturated carboxylic acids and derivatives thereof and organosilanes, said modifying agent having been absorbed into the carrier polymer; and
(c) controlling the period of time of contact betweeen the the copolymer and the modifying agent to provide a concentration of modifying agent in the copolymer that is at least 30% by weight of the copolymer, provided that said copolymer does not dissolve in the modifying agent and said concentrate is in solid form.

* * * * *